United States Patent
Ranke et al.

(10) Patent No.: US 9,642,113 B2
(45) Date of Patent: May 2, 2017

(54) PAGING PROCEDURE IN A CONTROL NODE

(71) Applicant: Telefonaktiebolaget LM Ericsson (publ), Stockholm (SE)

(72) Inventors: Karl-Peter Ranke, Herzogenrath (DE); Branko Djordjevic, Herzogenrath (DE); Robert Schnell, Aachen (DE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/917,228

(22) PCT Filed: Sep. 12, 2013

(86) PCT No.: PCT/EP2013/068899
§ 371 (c)(1),
(2) Date: Mar. 7, 2016

(87) PCT Pub. No.: WO2015/036022
PCT Pub. Date: Mar. 19, 2015

(65) Prior Publication Data
US 2016/0198432 A1    Jul. 7, 2016

(51) Int. Cl.
*H04W 68/00* (2009.01)
*H04L 29/06* (2006.01)
(Continued)

(52) U.S. Cl.
CPC ....... *H04W 68/005* (2013.01); *H04L 63/1458* (2013.01); *H04W 12/06* (2013.01); *H04W 12/12* (2013.01)

(58) Field of Classification Search
USPC .................................... 455/458, 450, 422.1
See application file for complete search history.

(56) References Cited

U.S. PATENT DOCUMENTS

| | | | |
|---|---|---|---|
| 7,277,735 B1* | 10/2007 | Oh ........................ | H04W 4/08 455/422.1 |
| 2002/0061756 A1* | 5/2002 | Bleckert .............. | H04W 68/12 455/458 |

(Continued)

FOREIGN PATENT DOCUMENTS

CN         1972512 A         5/2007

OTHER PUBLICATIONS

International Search Report and Written Opinion of the International Searching Authority, Application No. PCT/EP2013/068899, Sep. 9, 2014.

(Continued)

*Primary Examiner* — David Q Nguyen
(74) *Attorney, Agent, or Firm* — Sage Patent Group

(57) ABSTRACT

System, methods, nodes, and computer program products for handling paging of a user equipment for delivery of a terminating transaction are described. A user equipment is located in a radio coverage area, wherein the radio coverage area is controlled by the control node. The method includes initiating a paging request broadcast in the radio coverage area and opening, triggered by the initiating of the paging request broadcast, a paging response reception window. The method further includes storing, while the paging response reception window is open, all received paging responses. Furthermore, authenticating, if more than one paging response has been received, at least one user equipment which has provided a paging response, and continuing delivery of the terminating transaction to the user equipment which could be successfully authenticated.

20 Claims, 4 Drawing Sheets

(51) Int. Cl.
*H04W 12/12* (2009.01)
*H04W 12/06* (2009.01)

(56) References Cited

U.S. PATENT DOCUMENTS

| | | | | |
|---|---|---|---|---|
| 2009/0093263 A1* | 4/2009 | Del Signore | ......... | H04W 68/04 455/458 |
| 2014/0018088 A1* | 1/2014 | Vargantwar | ......... | H04W 68/005 455/450 |

OTHER PUBLICATIONS

3GPP, Technical Specification—"3rd Generation Partnership Project; Technical Specification Group Core Network and Terminals; Mobile radio interface layer 3 specification, Core network protocols; Stage 2 (Release 11)", 3GPP TS 23.108 V11.0.0 (Sep. 2011), 33 pp.

3GPP, Technical Specification—"3rd Generation Partnership Project; Technical Specification Group Core Network and Terminals; Mobile radio interface Layer 3 specification; Core network protocols; Stage 3 (Release 12)", 3GPP TS 24.008 V12.2.0 (Jun. 2013), 682 pp.

3GPP, Technical Specification—3rd Generation Partnership Project; Technical Specification Group Services and System Aspects; 3G Security; Security architecture (Release 11), 3GPP TS 33.102 V11.5.1 (Jun. 2013), 76 pp.

Golde et al., "Let Me Answer That for You: Exploiting Broadcast Information in Cellular Networks", *22nd USENIX Security Symposium*, Washington, DC, USA, Aug. 14-16, 2013, pp. 33-48.

Talbot, "Hacked Feature Phone Can Block Other People's Calls", *MIT Technology Review*, Aug. 26, 2013, downloaded Feb. 7, 2016 from https://www.technologyreview.com/s/518646/hacked-feature-phone-can-block-other-peoples-calls/, 9 pp.

Zivadinovic, "Modifizierte Handys fangen Telefonate und SMS ab", Aug. 30, 2013, downloaded Sep. 5, 2013 from http://www.heise.de/netze/meldung/Modifizierte-Handys-fangen-Telefonate-und-SMS-ab-1945963.html, 1 p. + translation (3 pp.).

\* cited by examiner

PAGING PROCEDURE IN A CONTROL NODE

CROSS REFERENCE TO RELATED APPLICATION

This application is a 35 U.S.C. §371 national stage application of PCT International Application No. PCT/EP2013/068899, filed on Sep. 12, the disclosure and content of which is incorporated by reference herein in its entirety. The above-referenced PCT International Application was published in the English language as International Publication No. WO 2015/036022 A1 on Mar. 19, 2015.

TECHNICAL FIELD

The present invention relates to telecommunications and in particular to a system, method, node and computer program for handling paging of a user equipment for delivery of a terminating transaction.

BACKGROUND

Recently an attack on GSM (Global System for Mobile communications) phones has been reported, where it is possible to prevent a certain victim UE (user equipment) from receiving mobile terminating traffic such as calls or SMS (Short Message Service).

The attack involves modifying a phone's embedded software so that it can trick the network out of delivering incoming calls or SMS messages to the intended recipients. In theory, one phone could block service to all subscribers served by radio base stations within a radio network coverage area e.g. known as a location area.

The patched firmware of the modified phones can block mobile terminating traffic because it simply responds to paging requests much faster than a standard phone ever could. When the network sends out a page request, the modified UE responds immediately, leaving no chance for the victim's UE to respond.

The paper, "Exploiting Broadcast Information in Cellular Networks" written by Nico Golde, Kévin Redon, and Jean-Pierre Seifert of Technische Universität Berlin and Deutsche Telekom Innovation Laboratories (retrievable under www.usenix.org/system/files/conference/usenixsecurity13/sec13-paper_golde.pdf) presented at a recent Security Conference provides more details about the possible attack.

The paging attack is possible due to a race condition when a UE responds to a paging request on the paging channel. The paging request initiated by the MSC (Mobile Switching Center) is broadcast in the location area where the terminal is located, so it is received by every UE in that location area. If a fraudulent terminal with modified implementation of the GSM protocol stack answers the paging request faster than the paged subscriber's UE, then the terminating transaction will be delivered to the fraudulent terminal instead. The delivery of the terminating transaction to the fraudulent terminal will eventually fail, if authentication or ciphering is used for this terminating transaction. However, still this prevents the intended subscriber to receive the terminating transaction.

The attack is possible due the time gap between paging request and the paging response and the authentication of the UE that has answered the paging.

This paper presented at a recent Security Conference suggests two countermeasures against this Denial-of-Service attack:

Firstly, to authenticate the UE before delivering mobile terminating traffic services. However, this implies that every mobile terminating call and mobile terminating SMS need to be authenticated by the MSC, which introduces a high load on MSC nodes, HLR (Home Location Register) and AuC (Authentication Center), which is not done today. Every authentication consumes one fresh authentication vector per mobile terminating call and per mobile terminating SMS. So this is hardly feasible in practice.

Secondly, the use of authenticated paging is proposed: this requires a change to the standards, and also corresponding changes in all MSC nodes and in all UEs. So this countermeasure cannot be applied for legacy UEs, leaving also this approach being hardly feasible in practice.

Since also UEs of fire brigade, police, or security squads are vulnerable for this Denial-of-Service attack, there is a clear need for an improved paging procedure with enhanced security, which can seamlessly be deployed into existing networks.

SUMMARY

In view of the above-said a need exists to improve the paging procedure in a control node handling mobile terminating transaction. The solution proposes a countermeasure that works with legacy UEs and does not increase the number of authentications for the normal terminating traffic cases, so where no Denial-of-Service attack is applied. Additionally the solution provides a notification such as an alarm to the network operator that an attack situation has been detected and provide an indication which geographical location of the radio network is affected.

The objects defined above are solved by the features of the independent claims. Preferred embodiments of the invention are described in the dependent claims.

According to an exemplary aspect of the invention, a method in a control node for handling paging of a user equipment for delivery of a terminating transaction is provided. The user equipment is located in a radio coverage area, wherein the radio coverage area is controlled by the control node. The method comprises initiating a paging request broadcast in the radio coverage area and opening, triggered by the initiating of the paging request broadcast, a paging response reception window. The method further comprises storing, while the paging response reception window is open, all received paging responses. The method further comprises authenticating, if more than one paging response has been received, at least one user equipment which has provided a paging response, and continuing delivery of the terminating transaction to the user equipment which could be successfully authenticated.

The method may further comprise that closing of the paging response reception window is triggered after a time interval.

The method may further comprise that closing of the paging response reception window is triggered, if more than one paging response has been received and one user equipment, that provided a paging response, could successfully be authenticated.

The method may further comprise that if more than one paging response has been received, the operator of the control node is notified.

The method may further comprise that the control node maintains parallel radio connections to all user equipment that provided a paging response.

According to another exemplary aspect of the invention, a control node for handling paging of a user equipment for delivery of a terminating transaction is provided. The control node is capable of controlling a radio coverage area in which the user equipment is located and initiating a paging request broadcast in the radio coverage area. The control node is further capable of opening, triggered by the initiating of the paging request broadcast, a paging response reception window. The control node is further capable of storing, while the paging response reception window is open, all received paging responses. The control node is further capable of authenticating, if more than one paging response has been received, at least one user equipment which has provided a paging response, and continue delivery of the terminating transaction to the user equipment which could be successfully authenticated.

According to another exemplary aspect of the invention, a system for handling paging of a user equipment for delivery of a terminating transaction is provided. The system comprises a control node, controlling a radio coverage area, a user equipment, being located in the radio coverage area, and a radio access network.

The foregoing and other objects, features and advantages of the present invention will become more apparent in the following detailed description of embodiments of the invention illustrated in the accompanying drawings.

BRIEF DESCRIPTION OF THE DRAWINGS

Further characteristics and advantages of the invention will become better apparent from the detailed description of particular but not exclusive embodiments, illustrated by way of non-limiting examples in the accompanying drawings, wherein.

DETAILED DESCRIPTION

Figure 1:
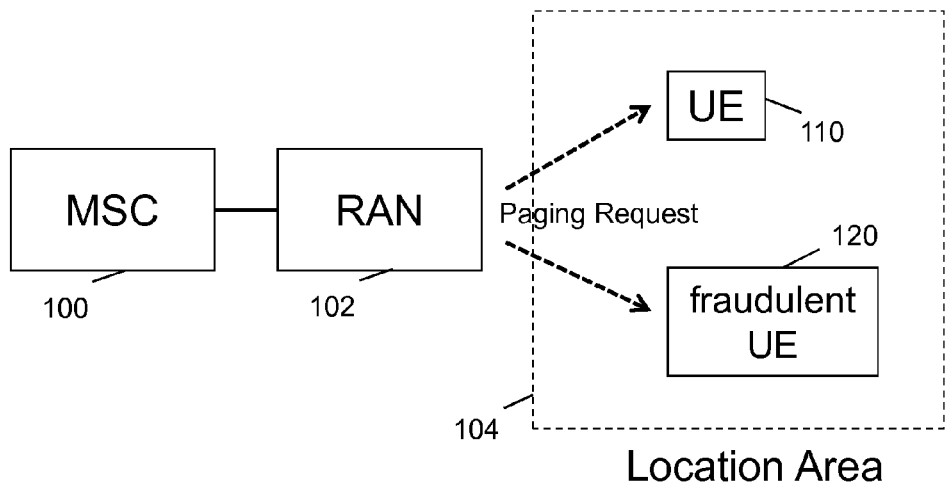
FIG. 1 shows a diagram illustrating a system for handling of paging of a UE in a control node according to the invention.

In the following, a system, methods, nodes, and computer programs for handling of paging of a UE in a control node according to the invention are described in more detail.

Within the context of the present application, the term "communication network" may particularly denote a collection of nodes or entities, related transport links, and associated management needed for running a service, for example a telephony service or a packet transport service. Depending on the service, different node types or entities may be utilized to realize the service. A network operator owns the communication network and offers the implemented services to its subscribers. Typical examples of a communication network are radio access network (such as GSM, 3G, WCDMA, CDMA, LTE, WLAN, Wi-Fi), mobile backhaul network, or core network (such as IMS (IP Multimedia System), Circuit Core, Packet Core).

Within the context of the present application, the term "control node" refers to a node of the communication network primarily performing control procedures for sessions or calls and services of a subscriber of the communication network. The term typically refers to those entities of the communication network handling control plane, subscriber data, services, or signaling traffic associated with user traffic in the communication network. In a core network a control node may be a MSC, MME (Mobility Management Entity), SGSN (Serving Gateway Support Node), P-CSCF (Proxy Call State Control Function), S-CSCF (Serving-CSCF), or TAS (Telephony Application Server) nodes.

Within the context of the present application, the term "user equipment" (UE) refers to a device for instance used by a person for his or her personal communication. It can be a telephone type of device, for example a fixed telephone or a SIP phone, cellular telephone, a mobile station, cordless phone, or a personal digital assistant type of device like laptop, notebook, notepad equipped with a wireless data connection. The UE may also be associated with non-humans like animals, plants, or even machines. A UE may be equipped with a SIM (Subscriber Identity Module) comprising unique identities such as IMSI (International Mobile Subscriber Identity) and/or TMSI (Temporary Mobile Subscriber Identity) associated with a subscriber using the UE. The presence of a SIM within a UE customizes the UE uniquely with a subscription of the subscriber.

Within the context of the present application, the term "MSC" refers to a control node of the circuit switched communication network. The MSC may be combined with a VLR (Visited Location Register) and be therefore also called MSC/VLR. The MSC node may also be enabled to control a remote MGW (Media Gateway) and therefore act as a server and may therefore be also called MSC Server or short MSC-S. Within the context of the present application MSC, MSC/VLR and MSC-S are functional equivalent.

Within the context of the present application, the term "authentication" refers to an act of confirming the authenticity of an entity. This might involve confirming the identity of an entity, so ensuring that an entity actually is what it claims to be. Authentication involves verifying the validity of identifications. A GSM based communication network authenticates the identity of the subscriber through the use of a challenge-response mechanism. A random number (RAND) is sent to the UE. The UE computes a signed response (SRES) based on the encryption of the random number (RAND) with a secret authentication algorithm using the individual subscriber authentication key (Ki). The calculation of the signed response (SRES) is processed within the SIM of the UE. Upon receiving the signed response (SRES) from the subscriber, the GSM based communication network repeats the calculation to confirm the authenticity of the entity.

Within the context of the present application, the term "paging" refers to broadcasting of a message in a limited radio coverage area to all UEs located in that radio coverage area. The paging message is sent on a paging control channel to alert a UE that there is a terminating transaction to be delivered from the network to the UE. UEs listen for paging messages with their identification code (IMSI number or TMSI number) on the paging control channel. Due to the broadcasting nature of the paging, a paging message is received by all UEs in the radio coverage area, but the paging message is ignored by a UE if it does not contain the own identification code.

Within the context of the present application, the term "terminating transaction" refers in a CS (circuit switched) context to any one of a terminating call request, a terminating short message request, a terminating location request, or a terminating unstructured supplementary service request. Within a PS (packet switched) context, "terminating transaction" refers to the delivery of a data packet destined to the UE.

Referring to FIG. 1, this figure shows a diagram illustrating a system for handling of paging of a UE in a control node according to an embodiment.

An MSC 100 controls via a RAN 102 (Radio Access Network) a location area 104. So the MSC 100 may correspond to a control node and the location area 104 may correspond to a radio coverage area. One or more UEs 110, 120 may be located within the location area 104, wherein the UE 110 is assumed to be a normal, unmodified UE, while the UE 120 is assumed to be a fraudulent UE, which has been modified in order to be able to respond much faster to paging requests than any normal UE.

So the FIG. 1 shows a MSC 100 for handling paging of a UE 110 for delivery of a terminating transaction, the UE 110 being located in a location area 104, wherein the location area 104 is controlled by MSC 100.

If the MSC 100 determines, that a mobile terminating transaction has to be delivered to the subscriber using the UE 110, the MSC 100 initiates a paging request broadcast in the location area 104. The MSC 100 initiates a paging request broadcast by sending a corresponding paging request signaling message to the RAN 102, which, when receiving this paging request signaling message, performs the paging broadcast in the location area 104.

The MSC 100 then opens, triggered by the initiating of the paging request broadcast, a paging response reception window. So right after sending the paging request signaling message to the RAN 102, the MSC 100 enters a state in which the MSC 100 is prepared to receive paging response messages. Within the context of the present application, this state of the MSC 100 is called paging response reception window.

While the MSC 100 is in this state, so while the paging response reception window is open, the MSC 100 stores all received paging responses received from UEs.

In a next step, received paging responses are handled. If more than one paging response has been received, the MSC 100 authenticates the UEs 110, 120, which have provided a paging response. The MSC 100 then continues the delivery of the terminating transaction to the UE 110 which could be successfully authenticated. After having broadcast the paging request, all UEs in the location area 104 receive the paging request. The paging request comprises an identification code of the UE 110 that is paged. The standard compliant behavior is that only the UE 110 with that identification code responds to the paging request. However, in this embodiment it is assumed that also a fraudulent UE 120 is present in the location area 104. This fraudulent UE 120 is modified to respond to any paging request very quickly, regardless of the identification code comprised in the paging request.

By authenticating the UEs that provided a paging response, it is possible for the MSC 100 to identify the correct UE, as only an authorized UE can pass the authentication successfully.

After closing of the paging response reception window, storing of received paging responses is stopped, and later paging responses are ignored and discarded. The closing of the paging response reception window may be triggered after a time interval. In order to ensure that UEs have sufficient time to send their paging response, the time interval may be longer than or equal to the maximum paging response time of the UE 110. Since the maximum paging response time of UEs may change over time when new UE models become available, the time interval may be configurable by the operator of the MSC 100. So the operator may perform measurements on the maximum paging response time of UEs and configure the time interval in the MSC 100 accordingly. This ensures that all possible paging responses from all UE can be captured by the MSC 100 within the paging response reception window.

By alternative, the paging response reception window may be closed already before the time interval elapses. The closing of the paging response reception window may be triggered if more than one paging response has been received and one UE 110, that provided a paging response, could successfully be authenticated. So right after reception of a second paging response, the MSC 100 may start to authenticate the UEs. And if a UE, which provided a paging response, could be successfully authenticated, the authorized UE 110 has been found and there is no further need to wait for more paging responses, and the paging response reception window may be closed even before the time interval elapses.

As described in the background, authentication is a capacity consuming process and every authentication consumes one fresh authentication vector. Also the generation of authentication vectors is capacity consuming. In addition, authentication loads the radio network and the air interface in the location area. Therefore authentication today is optional and is not done (according to operator configuration in the MSC 100) for every terminating transaction. This principle is retained by the present application, if a single paging response is received, so for all normal cases where no paging response denial-of-service attack is encountered.

If more than paging response is received, at least one authentication is required to determine the authorized UE. In this case the step of authentication may be triggered after closing of the paging response reception window. In this case the closing of the paging response reception window is triggered by the lapse of the time interval.

So the operator has a choice between very quickly identifying the paging response of the correct UE and continue delivering the terminating transaction, or saving of network and node capacity and wait until all UEs have responded and the time interval elapses, and by that accept some delay compared to today's delivery time of terminating transactions.

There is another option to speed up the identification of the correct UE. If more than one paging response has been received, authentication of the UE's that provided a paging response, is done for the second received paging response first. In a normal case, only one UE shall respond to the paging request. In the case a fraudulent UE 120 is present in the location area 104, two paging responses will be received by the MSC 100. However, as the fraudulent UE 120 is modified to respond very fast, the paging response of the correct UE 110 will be received as a second paging response. So in this case, by doing the authentication step for the second received paging response first, there is a very high likelihood that the correct paging response is authenticated first, and there would be no need any more to authenticate the first received, fraudulent paging response.

In order to take counteractions against this Denial-of-Service attack, it is important that the operator is informed about such attacks. So if more than one paging response has been received in the MSC 100, the operator of the MSC 100 may be notified.

This notification to the operator of the MSC 100 may comprise positioning information of at least one UE 120 which could not be successfully authenticated. According to the standard, the RAN 102 provides information on the radio cell, in which the paging response was received from a UE, to the signaling message informing the MSC 100 on the paging response. So for example for the GSM standard the radio cell information may be comprised in the BSSMAP (Base Station Subsystem Mobile Application Part) Complete Layer 3 message carrying the paging response message.

The paging response message from a UE 110, 120 to the MSC 100 opens a radio channel between the UE 110, 120 and the MSC 100. So when collecting paging responses from UEs 110, 120 from the location area 104, the MSC 100 maintains parallel radio connections to all UEs 110, 120 that provided a paging response. If authentication of a UE 110 is successful, this radio connection is maintained for the delivery of the terminating transaction. If authentication of a UE 120 fails, the corresponding radio connection is released immediately.

The MSC 100 buffers any further messages received after a paging response via the parallel radio connections while the paging response reception window is open. If authentication of a UE 110 is successful, any buffered message is handled. If authentication of a UE 120 fails, any buffered message is ignored and discarded. This is of importance for the handling of an IMSI Detach message from a UE 120 to the MSC 100 since according to the standard the sending UE of a IMSI Detach message is not authenticated (due to time constraints, e.g. at power off). So another possible attack of a fraudulent UE 120 could be to send IMSI Detach right after paging response and by that the fraudulent UE 120 could cause a victim's UE 110 to be detached from the MSC 100. Also this attack could be prevented by the presented application, since an IMSI Detach message from a fraudulent UE 120 may be buffered and discarded after unsuccessful authentication of the fraudulent UE 120.

Figure 2:
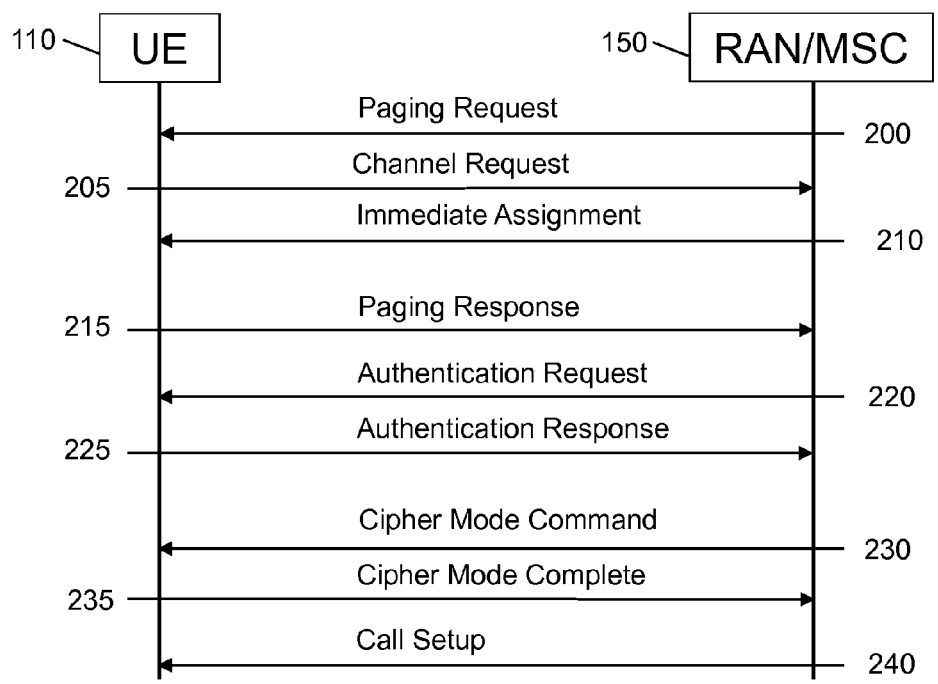
FIG. 2 shows a procedure flow diagram illustrating a procedure according to 3GPP TS 23.108 for setting up a terminating mobile call according to prior art.

Referring to FIG. 2, this figure shows a procedure flow diagram illustrating a procedure according to 3GPP TS 23.108 for setting up a terminating mobile call according to prior art.

This procedure flow is presented in order to provide background on how to deliver a terminating transaction to a UE 110, using as example the case of a terminating CS call and GSM radio access. The procedure flow shows the signaling procedure interaction between a UE 110 and the network 150, which in this case is a combination of the RAN 102 and the MSC 100.

The procedure flow starts when the MSC determines that it has to deliver a terminating call to a UE 110. After having identified the radio coverage area 104 in which the target UE 110 is located, the MSC 100 determines the RAN 102 nodes being responsible for this radio coverage area 104. Note that in case of GSM radio coverage, the radio coverage area is also called location area 104.

The MSC 100 then initiates paging of the UE 110 by sending a Paging Request message 200 via the RAN 102 to the UE 110. This Paging Request message 200 is broadcast on a common paging channel to all UEs 110 in the location area 104.

The UE 110 detects a Paging Request message 200 for its own identity on the paging channel, and triggered by this the UE 110 request a dedicated channel from the network 150 by sending Channel Request message 205. The network 150 then assigns this dedicated channel and responds with Immediate Assignment message 210.

Having now access to a dedicated channel, the UE 110 opens a radio connection to the network 150 and sends Paging Response to the network 150 via this established radio connection.

As an optional procedure, the network 150 may then authenticate the UE 110 in order to determine that the UE 110 is authorized to receive the terminating call. The authentication is done with the Authentication Request message 220 and the corresponding response Authentication Response message 225.

As an optional procedure, the network 150 may then start to cipher the communication between the network 150 and the UE 110. This is done with the Cipher Mode Command message 230 and the corresponding response Cipher Mode Complete message 235.

Then the network 150 delivers the terminating call to the UE 110 by sending Setup message 240 to the UE 110.

The reminder of the terminating call setup procedure flow is omitted for simplification reasons as these parts are not relevant for the described embodiments.

Figure 3:
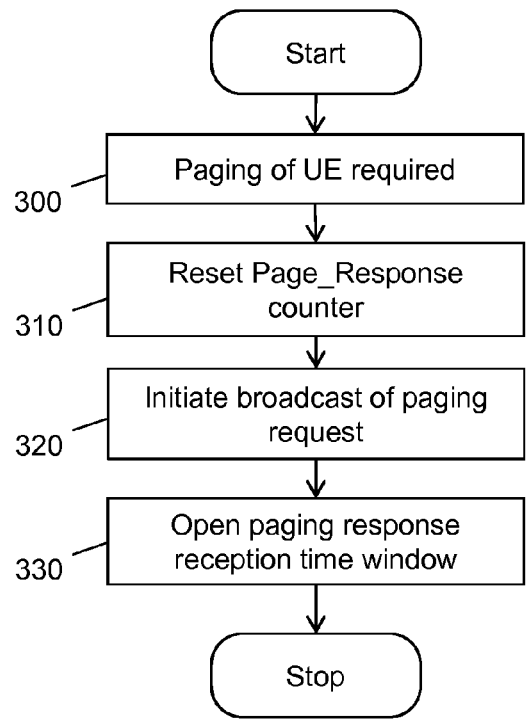
FIGS. 3-5 show flow diagrams in a control node for handling of paging of a UE according to the invention.

Referring to FIG. 3, this figure shows a flow diagram in a control node for handling of paging of a UE according to an embodiment. The control node may correspond to an MSC 100.

The procedure flow starts with the determination 300 that a paging of a UE 110 is required.

In a next step a counter counting received paging responses is reset 310 to an initial value indicating that no paging response has been received.

Then the MSC 100 initiates 320 the broadcasting of a paging request in the radio coverage area 104. The MSC 100 initiates this via the RAN 102.

As a final step of this procedure flow the paging response reception window is opened 330. Then the procedure flow ends.

Figure 4:
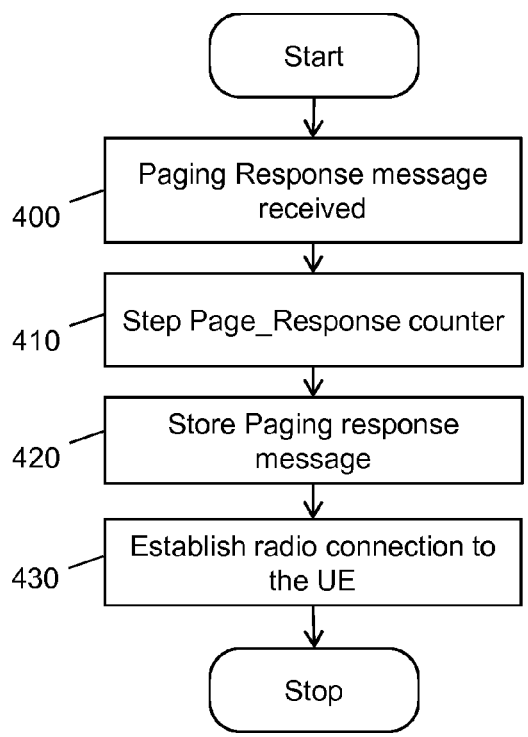

Referring to FIG. 4, this figure shows a flow diagram in a control node for handling of paging of a UE according to an embodiment. The control node may correspond to an MSC 100.

The procedure flow starts with the reception 400 of a paging response message from a UE 110, 120 via the RAN 102

Triggered by this reception of a paging response message the page response counter is stepped 410.

The received paging response message is stored 420 in the MSC 100.

The MSC 100 then establishes 430 a radio connection to the UE that provided the paging response. Then the procedure flow ends.

The procedure flow according to FIG. 4 is triggered for each received paging response message received while the paging response reception window is open. Each time the page response counter is stepped, resulting in that the counter indicates the number of received paging responses. For each paging response the MSC 100 establishes a radio connection to the UE that provided the paging response. If multiple paging responses are received for a single paging request, the MSC 100 maintains multiple parallel radio connections.

Figure 5:
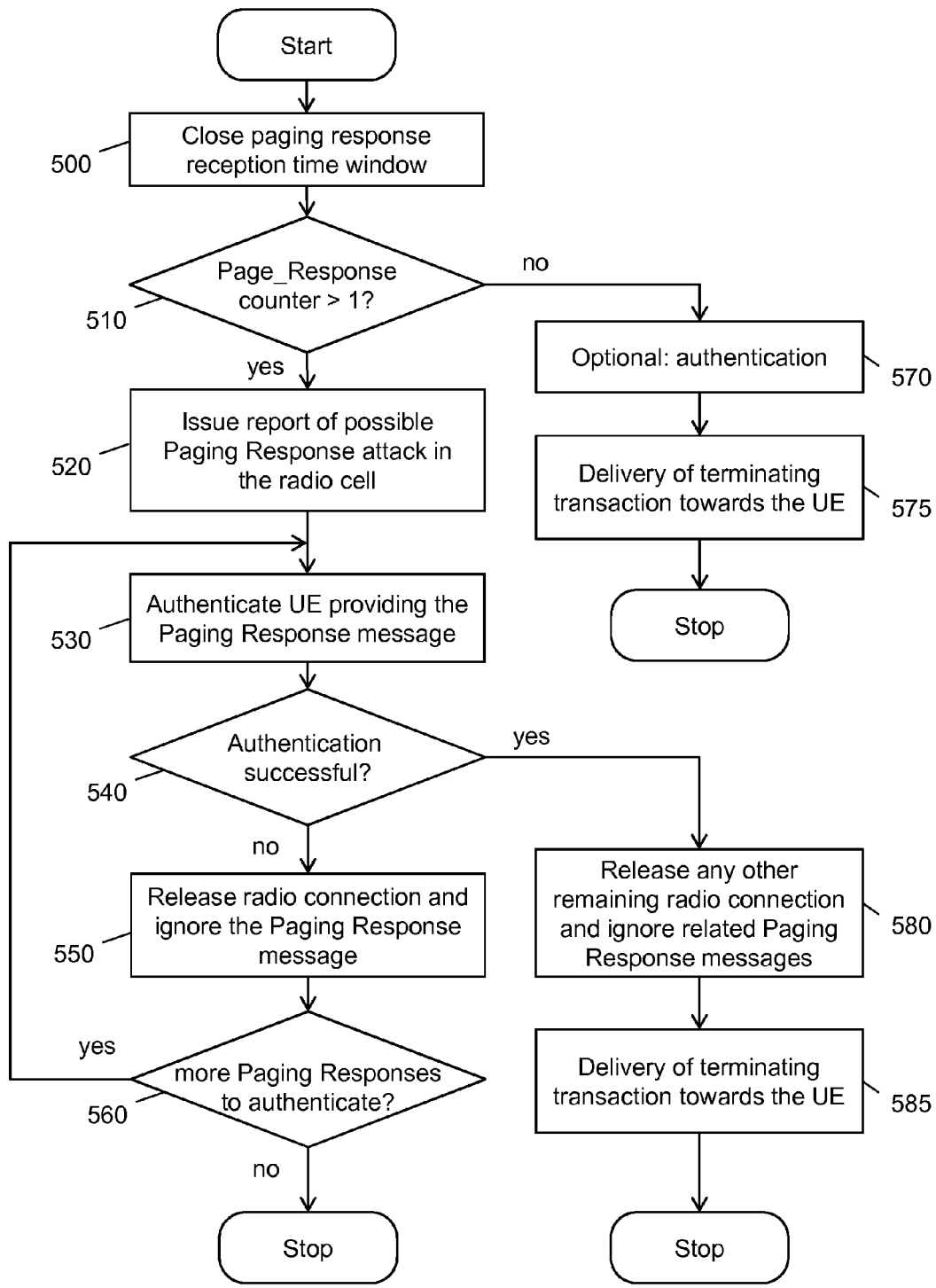

Referring to FIG. 5, this figure shows a flow diagram in a control node for handling of paging of a UE according to an embodiment. The control node may correspond to an MSC 100.

The procedure flow starts with the closing 500 of the paging response reception time window. This embodiment assumes that the closing of the paging response reception window is time supervised and is triggered in step 500 by the elapsing of the time interval.

In the next step 510 the page response counter is checked. If the counter indicates that there has been only a single paging response received, the procedure flow continues with step 570. If more than one paging response has been received, the procedure flow continues with step 520.

If the counter indicates that there has been only a single paging response received, in step 570 optionally the responding UE is authenticated. This step may depend on operator configuration of the MSC 100. Then in step 575 the normal delivery of the terminating transaction takes place. As there has been no second paging response, this is the normal case without attack of a fraudulent UE 120. Then the procedure flow ends.

If the counter indicates that there has been more than one paging responses received, in step 520 the MSC 100 issues a report/alarm or a notification to the operator that a possible paging response attack has been detected. This report/alarm or a notification may contain an indication of the radio cell where the fraudulent UE 120 is located.

From now on the procedure flow enters a loop authenticating the UEs that have responded to the paging request.

So in step 530 a UE, having provided a paging response, is authenticated.

In step 540 the result of the authentication is checked. If the authentication was successful, the procedure flow continues with step 580. If the authentication was not successful, the procedure flow continues with step 550.

If the authentication was successful in step 540, in step 580 the correct UE 110 has been identified. This means that all other received paging responses are ignored and are discarded. Also the related radio connections to those UEs are released immediately. Then in step 585 the normal delivery of the terminating transaction takes place. Then the procedure flow ends.

If the authentication was not successful in step 540, the procedure flow continues with step 550 where the received paging response is ignored and discarded. Also the related radio connection to this UE is released immediately.

In step 560 it is checked whether there have been more paging responses received. If the answer is no, so no more paging responses have been received, the flow ends.

If more paging responses have been received, a jump back to the beginning of the loop is done and the procedure flow is continued with step 530.

Figure 6:
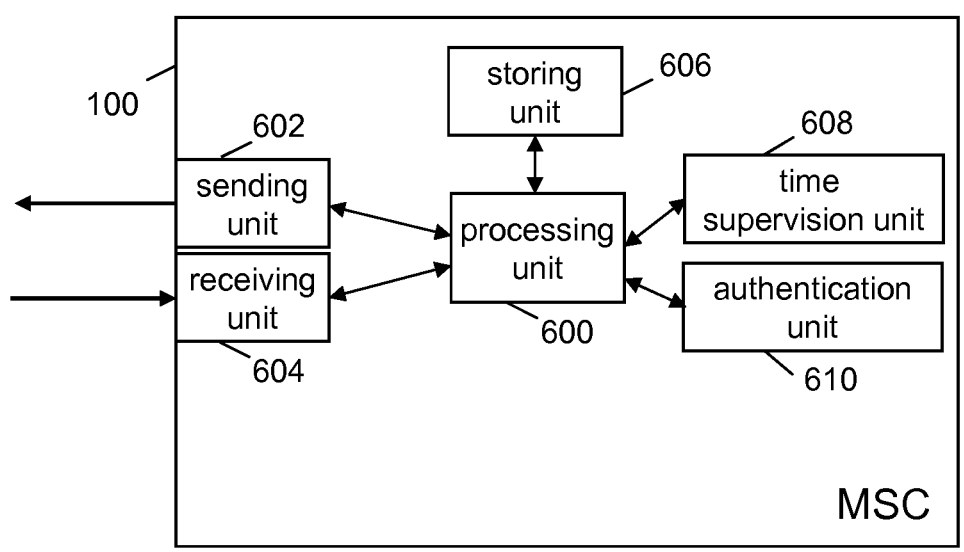
FIG. 6 is a block diagram illustrating a control node according to the invention.

Referring to FIG. 6, this figure shows block diagram illustrating a control node according to an embodiment. The illustrated entity may correspond to the MSC 100. The MSC 100 may be adapted to perform one or more steps of the above described methods shown in FIGS. 3 to 5.

The MSC 100 may comprise a number of functional units, which are described in further detail below and which are adapted to perform respective method steps.

A processing unit 600 of the MSC 100 may be adapted to control a radio coverage area 104 in which the UE 110 is located. The processing unit 600 may further be adapted to initiate a paging request broadcast in the radio coverage area 104. The processing unit 600 may also be adapted to open, triggered by the initiating of the paging request broadcast, a paging response reception window. The processing unit 600 may further be adapted to store, while the paging response reception window is open, all received paging responses. The processing unit 600 may also be adapted to authenticate, if more than one paging response has been received, at least one UE 110, 120 which has provided a paging response, and continue delivery of the terminating transaction to the UE 110 which could be successfully authenticated. In a practical implementation the processing unit 600 may be one processor taking care of all the above functions, or may also be distributed over more than one processor, wherein the functions are distributed over the available processors.

The MSC 100 may further comprise a sending unit 602 and a receiving unit 604 via which the MSC 100 can communicate with other entities such as the UE 110, 120, or other nodes of the network. The sending unit 602 may send out signaling messages composed by the processing unit 600. The receiving unit 604 may receive signaling messages originating from the UE 110, 120, or other nodes of the network, and forward the received signaling messages to the processing unit 600 for handling. The MSC 100 may comprise more than one sending unit and receiving unit for signaling capacity and redundancy reasons.

The MSC 100 may also comprise a storing unit 606 for storing information related to the paging of UEs and subscriber data. The storing unit 606 may comprise various types of memory such as volatile memory, non-volatile memory, hard disk drives, solid state drives, a network interface to a database or a data center, secure digital cards, or hardware such as smart cards, non-reversible chips, security chips, security modules, or trusted platform module devices. The storing unit 606 may be used by the processing unit 600 to store information such as received paging response messages, or program code.

The MSC 100 may further comprise a time supervision unit 608 for handling time supervision tasks. The time supervision unit 608 may implement the paging response reception window interval timer used to time supervise the reception of paging response messages from a UE 110, 120. A timer may for example be implemented by a periodic interrupt signal from a system clock and a counter, or by a processor clock of the procession unit 600 and a shift register. A timer in the time supervision unit 608 may be instantiated, started, stopped, reset, and removed by instructions from the procession unit 600.

The MSC 100 may further comprise an authentication unit 610 for handling the authentication of UEs 110, 120. The authentication unit 610 may verify the validity of identifications. It may authenticate the identity of the UE through the use of a challenge-response mechanism. A random number (RAND) is sent to the UE. The UE computes a signed response (SRES) based on the encryption of the random number (RAND) with a secret authentication algorithm using the individual subscriber authentication key (Ki). The calculation of the signed response (SRES) is processed within the SIM of the UE. Upon receiving the signed response (SRES) from the subscriber, the authentication unit 610 may repeat the calculation to confirm the authenticity of the entity.

According to another embodiment, a computer program is provided. The computer program may be executed by the processing unit 600 of the above mentioned MSC 100 such that a method for handling paging of a UE 110 for delivery of a terminating transaction as described above with reference to FIGS. 3-5 may be carried out or be controlled. In particular, the MSC 100 may be caused to operate in accordance with the above described method by executing the computer program.

The computer program may be embodied as computer code, for example of a computer program product. The computer program product may be stored on a computer readable medium, for example a disk or the storing unit 606 of the MSC 100, or may be configured as downloadable information.

One or more embodiments as described above may enable at least one of the following technical effects:

Protection against Denial-of-Service attacks by fraudulent UEs modified to respond to paging much faster than standard UEs.

Protection mechanism can be deployed into existing networks without changes to UEs and without network or node capacity impact.

Protection mechanism works for GSM, WCDMA, LTE, or similar cellular radio access technologies, using CS or PS access technologies.

Protection against fraudulent IMSI Detach attempts from fraudulent UEs trying to detach a victim's UEs from the MSC.

Notify the operator that a Denial-of-Service attack is encountered and also provide the position of the fraudulent UE.

Modifications and other embodiments of the disclosed invention will come to mind to one skilled in the art having the benefit of the teachings presented in the foregoing descriptions and the associated drawings. Therefore, it is to be understood that the embodiments are not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method in a control node for handling paging of a user equipment for delivery of a terminating transaction, the user equipment being located in a radio coverage area, wherein the radio coverage area is controlled by the control node, the method comprising:
   initiating a paging request broadcast to a plurality of user equipments in the radio coverage area;
   opening, triggered by the initiating of the paging request broadcast, a paging response reception window;
   storing, while the paging response reception window is open, all received paging responses from the plurality of user equipments; and
   authenticating, if more than one paging response has been received, at least one user equipment of the plurality of user equipments which has provided a paging response, and continuing delivery of the terminating transaction to the at least one user equipment which could be successfully authenticated.

2. The method according to claim 1, wherein a closing of the paging response reception window is triggered after a time interval.

3. The method according to claim 2, wherein the time interval is longer than or equal to the maximum paging response time of the user equipment.

4. The method according to claim 2, wherein the time interval is configurable by an operator of the control node.

5. The method according to claim 1, wherein the closing of the paging response reception window is triggered if more than one paging response has been received and one user equipment, that provided a paging response could successfully be authenticated.

6. The method according to claim 1, wherein the authenticating is triggered after closing of the paging response reception window.

7. The method according to claim 1, the method further comprising:
   authenticating, if more than one paging response has been received, the user equipment that provided a second paging response of the more than one paging responses.

8. The method according to claim 1, wherein if more than one paging response has been received, the operator of the control node is notified.

9. The method according to claim 8, wherein the notification to the operator of the control node comprises positioning information of at least one user equipment which could not be successfully authenticated.

10. The method according to claim 1, wherein the control node maintains parallel radio connections to all user equipment that provided a paging response.

11. The method according to claim 10, wherein the control node buffers any further messages received after a paging response via the parallel radio connections while the paging response reception window is open.

12. A control node for handling paging of a user equipment for delivery of a terminating transaction, the control node configured to perform operations comprising:
   controlling a radio coverage area in which the user equipment is located;
   initiating a paging request broadcast to a plurality of user equipments in the radio coverage area;
   opening, triggered by the initiating of the paging request broadcast, a paging response reception window;
   storing, while the paging response reception window is open, all received paging responses from the plurality of user equipments; and
   authenticating, if more than one paging response has been received, at least one user equipment of the plurality of user equipments which has provided a paging response, and continuing delivery of the terminating transaction to the at least one user equipment which could be successfully authenticated.

13. The control node according to claim 12, wherein the closing of the paging response reception window is triggered if more than one paging response has been received and one user equipment, that provided a paging response could successfully be authenticated.

14. A system for handling paging of a user equipment for delivery of a terminating transaction, the system comprising:
   a control node according to claim 12, controlling a radio coverage area;
   a user equipment, being located in the radio coverage area; and
   a radio access network.

15. The control node according to claim 12, wherein a closing of the paging response reception window is triggered after a time interval.

16. The control node according to claim 12, wherein the time interval is longer than or equal to the maximum paging response time of the user equipment.

17. The control node according to claim 12, wherein the authenticating is triggered after closing of the paging response reception window.

18. The control node according to claim 12, further comprising:
   authenticating, if more than one paging response has been received, the user equipment that provided a second paging response of the more than one paging responses.

19. The control node according to claim 12, wherein the notification to the operator of the control node comprises positioning information of at least one user equipment which could not be successfully authenticated.

20. A computer program product comprising a non-transitory computer readable storage medium storing instructions which, when executed on at least one processor, cause the at least one processor to carry out the method according to claim 1.

* * * * *